United States Patent
Yang et al.

(10) Patent No.: US 11,571,881 B2
(45) Date of Patent: *Feb. 7, 2023

(54) HARD COATING FILM HAVING MULTILAYER-STRUCTURE, AND POLYIMIDE FILM COMPRISING SAME

(71) Applicant: KOLON INDUSTRIES, INC., Seoul (KR)

(72) Inventors: Pil Rye Yang, Seoul (KR); Dong Hee Lee, Seoul (KR); Sang Hyun Ahn, Seoul (KR); Hang Geun Kim, Seoul (KR); Seong Hoon Baek, Seoul (KR); Byung Joon An, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/321,453

(22) Filed: May 16, 2021

(65) Prior Publication Data

US 2021/0276312 A1 Sep. 9, 2021

Related U.S. Application Data

(63) Continuation of application No. 16/644,058, filed on Mar. 3, 2020, now Pat. No. 11,117,355.

(51) Int. Cl.
*B32B 27/08* (2006.01)
*B32B 7/022* (2019.01)
*B32B 27/28* (2006.01)
*C08G 77/04* (2006.01)

(52) U.S. Cl.
CPC ............ *B32B 27/08* (2013.01); *B32B 7/022* (2019.01); *B32B 27/281* (2013.01); *B32B 27/283* (2013.01); *C08G 77/04* (2013.01); *B32B 2307/412* (2013.01); *B32B 2307/536* (2013.01)

(58) Field of Classification Search
CPC ........ B32B 2307/412; B32B 2307/536; B32B 27/08; B32B 27/281; B32B 27/283; B32B 7/022; C08G 77/04; C08G 77/50; C09D 183/14

See application file for complete search history.

(56) References Cited

U.S. PATENT DOCUMENTS

| 2016/0024348 A1 | 1/2016 | Kim |
| 2018/0346760 A1 | 12/2018 | Kim |

FOREIGN PATENT DOCUMENTS

| EP | 1994080 | | 10/2007 |
| WO | 2017116103 | A1 | 7/2017 |
| WO | 2017214105 | A2 | 12/2017 |
| WO | 2018005833 | A2 | 1/2018 |

OTHER PUBLICATIONS

Counterpart EP search report dated Jul. 1, 2021.

*Primary Examiner* — Lawrence D Ferguson
(74) *Attorney, Agent, or Firm* — Harvest IP Law, LLP

(57) ABSTRACT

The present invention relates to a hard coating film having a multilayer-structure and, specifically, to a hard coating film having a multilayer-structure, which has a low Vickers hardness (Hv) value while having an excellent scratch resistance together with flexibility.

8 Claims, 1 Drawing Sheet

```
┌─────────────────────────────┐
│                             │
│    A high-hardness layer    │
│                             │
├─────────────────────────────┤
│                             │
│   A highly bendable layer   │
│                             │
├─────────────────────────────┤
│                             │
│    A transparent substrate  │
│                             │
└─────────────────────────────┘
```

HARD COATING FILM HAVING MULTILAYER-STRUCTURE, AND POLYIMIDE FILM COMPRISING SAME

CROSS REFERENCE TO RELATED APPLICATIONS

This is a continuation application of U.S. application Ser. No. 16/644,058 filed Mar. 3, 2020 which is a continuation application of a National Stage of International Application No. PCT/KR2018/010280 filed Sep. 4, 2018, claiming priority based on Korean Patent Application Nos. 10-2017-0112517 filed Sep. 4, 2017 and 10-2018-0104693 filed Sep. 3, 2018.

TECHNICAL FIELD

The present disclosure relates to a hard coating film having a multiple-layer structure and a polyimide film including the same.

BACKGROUND ART

Transparent polymer films are widely used as core materials in the fields of optical and flexible displays, and in particular are replacing glass in the display industry due to the light weight and ease of processing. However, transparent polymer films have a disadvantage of poor abrasion resistance due to the low surface hardness compared to glass. Accordingly, research on hard coating for high hardness has been actively conducted, but when the high hardness is achieved, flexibility, which is the opposite physical property, is reduced, which is disadvantageous. For this purpose, coating techniques for satisfying the surface hardness and flexibility of polymer films arise as an important issue.

The materials used for hard coating broadly include organic materials, inorganic materials and hybrid organic-inorganic materials. Thereamong, organic materials have advantages of flexibility and moldability due to the inherent characteristics of organic substances, but have the disadvantage of low surface hardness, whereas inorganic materials have the advantages of high surface hardness and transparency, but have the disadvantages of poor flexibility and moldability.

For this reason, hybrid organic-inorganic materials having the advantages of both materials are receiving attention at present, and active research thereon is underway. However, it is not possible at present to realize the advantages of both types of materials.

Korean Patent Laid-open Publication No. 2014-0104175 and International Patent Laid-open Publication No. 2013-187699 also use organic or inorganic materials to increase surface hardness, but the physical properties of flexibility and formability were not satisfactory.

As such, when the surface hardness is improved, curling and cracking may occur due to shrinkage of the coating layer, which causes the coating layer to peel off due to the deteriorated adhesivity. Meanwhile, when hardness is decreased to secure the desired flexibility, abrasion resistance is also deteriorated.

Therefore, the development of a coating material having surface hardness, flexibility and ease of processing while resisting curling is expected to become an essential technology for wider application of polymer films.

DISCLOSURE

Technical Problem

Therefore, the present disclosure has been made in view of the above problems, and it is one object of the present disclosure to provide a hard coating film that is introduced with a multilayer structure to satisfy the property of high hardness in an upper-layer structure and the property of high bending in a lower-layer structure to thereby secure all of hardness, scratch resistance and flexibility, and a polyimide film including the same.

Technical Solution

In accordance with one aspect of the present disclosure to solve the technical problems, provided is a hard coating film having a structure in which a highly bendable layer and a high-hardness layer are stacked on a substrate in that order, wherein the highly bendable layer has a Vickers hardness (Hv) of 40 or less, the high-hardness layer has a Vickers hardness (Hv) of 55 or more, and the hard coating film including the highly bendable layer and the high-hardness layer stacked on the substrate in that order has a Vickers hardness (Hv) of 20 to 65.

The substrate may be a transparent polyimide substrate.

The hard coating film may have a reverse R of 2.0 or less.

The hard coating film may have a tensile fracture point of more than 6%.

The hard coating film may have a bendability (EIT (indentation modulus)/HIT (indentation hardness) of 8 or more.

The hard coating film may have a transmittance of 90% or more and a haze of 1.0% or less.

The highly bendable layer may have a thickness of 1 to 200 μm, and the high-hardness layer may have a thickness of 30 μm or less.

The highly bendable layer may include a siloxane resin obtained by polymerizing a compound including: at least one alkoxysilane selected from an alkoxysilane represented by the following Formula 1 and an alkoxysilane represented by the following Formula 2; and a diol represented by the following Formula 3:

$$R^1{}_n Si(OR^2)_{4-n} \qquad \text{<Formula 1>}$$

wherein $R^1$ is a C1-C3 linear, branched or cyclic alkyl group substituted with epoxy or acryl, $R^2$ is a C1-C8 linear, branched or cyclic alkyl group, and n is an integer of 1 to 3, $$Si(OR^3)_4 \qquad \text{<Formula 2>}$$

wherein $R^3$ represents a C1 to C4 linear or branched alkyl group, $$HO(CH_2)_n OH \qquad \text{<Formula 3>}$$

wherein n is an integer of 1 to 10.

The high-hardness layer may include a siloxane resin obtained by polymerizing a compound including at least one alkoxysilane selected from the alkoxysilane represented by Formula 1 and the alkoxysilane represented by Formula 2.

In accordance with a second aspect of the present disclosure, there is provided a polyimide film including the hard coating film.

Advantageous Effects

The hard coating film having a multi-layered structure and the polyimide film including the same according to the present disclosure are capable of obtaining effects of excellent scratch resistance and flexibility, in spite of low Vickers hardness (Hv).

BEST MODE

In one aspect, the present disclosure is directed to a hard coating film having a structure in which a highly bendable layer and a high-hardness layer are stacked on a substrate in that order, wherein the highly bendable layer has a Vickers hardness (Hv) of 40 or less, and the high-hardness layer has a Vickers hardness (Hv) of 55 or more, and the hard coating film including the highly bendable layer and the high-hardness layer stacked on the substrate in that order has a Vickers hardness (Hv) of 20 to 65.

Figure 1:
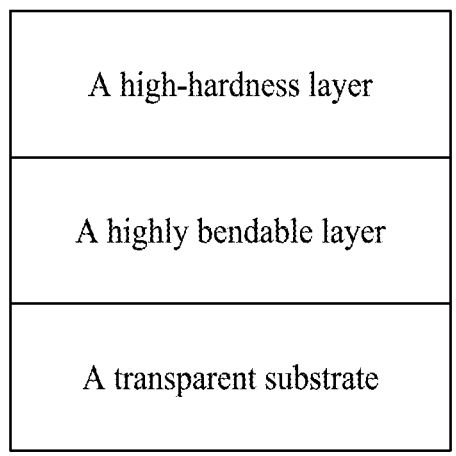
FIG. 1 is a schematic diagram showing a hard coating film having a multilayer structure according to the present disclosure.

FIG. 1 is a schematic diagram showing a hard coating film having a multilayer structure according to the present disclosure.

This structure will be described in detail with reference to FIG. 1. The hard coating film according to the present disclosure has a multilayer structure in which a highly bendable layer (hereinafter, referred to as a "lower layer") is laminated on a transparent substrate, and a high-hardness layer (hereinafter, referred to as an "upper layer") is stacked on the highly bendable layer.

When the lower layer has a Vickers hardness (Hv) of 40 or less, preferably 15 to 35, and more preferably 20 to 30, it bends well when folded due to the excellent flexibility thereof, and has an effect of achieving flexibility to prevent the coating layer from breaking.

When the upper layer has a Vickers hardness (Hv) of 55 or more, preferably 60 or more, an effect of preventing scratches generated by external impacts can be obtained due to the high hardness of the upper layer.

In addition, when the hard coating film including both the lower layer and the upper layer has a Vickers hardness (Hv) of 20 to 65, preferably 20 to 55, and more preferably 20 to 50, a hard coating having bendability of 2.0 or less and resisting scratching can be obtained.

The hard coating film described above includes a lower layer and an upper layer having a Vickers hardness within a specific range and thereby exhibits excellent scratch resistance and can obtain physical properties such as a reverse R of 2.0 or less, preferably 0.4 to 2.0, and a tensile fracture point of 6% or more, preferably 6 to 50%, bendability (EIT/HIT, wherein EIT is an indentation modulus, and HIT is an indentation hardness, of 8 or more, preferably 8 to 40, transmittance of 90% or more and a haze of 1.0% or less.

In particular, the EIT/HIT is a value obtained when measured with an indenter, EIT represents an indentation modulus and HIT represents an indentation hardness. These values can serve as parameters for bendability and can be used as reference physical properties of the tensile fracture point, which is another index of bendability.

In this case, the Vickers hardness of the lower layer, the upper layer and the multilayer hard coating film including the same are hardness measured using an indenter.

In general, the hard coating film needs excellent surface hardness in order to prevent damage upon external impact. However, when surface hardness is increased, there is a problem in that flexibility is reduced.

In the present disclosure, a hard coating film including a lower layer having a Vickers hardness (Hv) of or less and an upper layer having a Vickers hardness (Hv) of 55 or more has a Vickers hardness (Hv) of 20 to 65 wherein the Vickers hardness is measured using an indenter, and thus ensures all of hardness, scratch resistance and flexibility.

There are various criteria for indicating hardness, such as Brinell hardness, Rockwell hardness and Shore hardness. In conventional hard coating films, since the parameter indicating hardness is measured as pencil hardness, the criterion for determination between people who perform measurement differ when determining hardness, and the results depend on subjective observations by people. The present disclosure adopts a measurement method using an indenter as a method that is capable of solving the drawback of pencil hardness and indicating a quantified hardness. More specifically, Vickers hardness (Hv) can be obtained by measuring with an indenter, and the parameter for hardness can be digitized and quantified by introducing this parameter.

Figure 2:
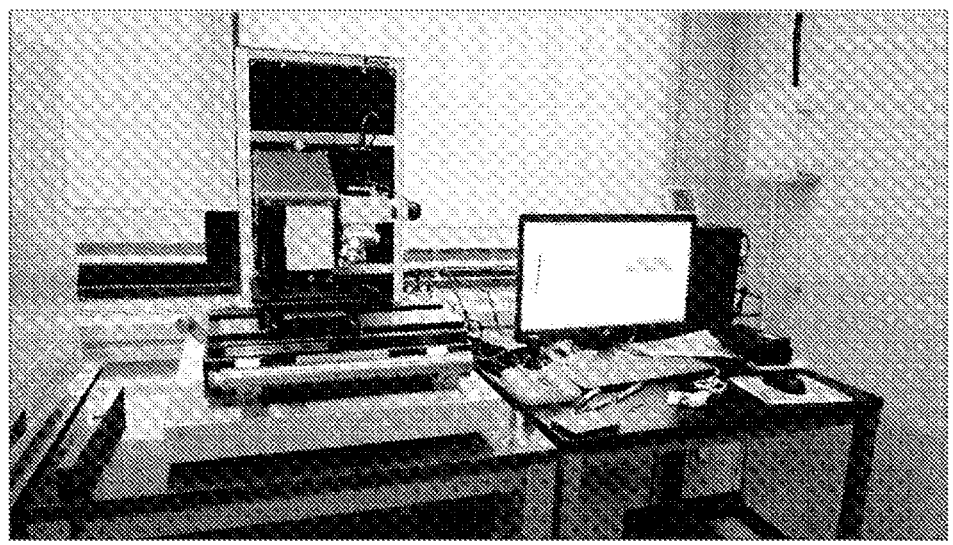
FIG. 2 is an image showing an indenter.

FIG. 2 is an image showing an indenter. As shown in FIG. 2, the indenter is a tester for measuring the physical properties of the surface and superficial layers of various materials (from diamond to rubber) in fields such as metal materials, hard coating, plating, paint and LCD, based on nano-scale indentation of membranes. The indenter is utilized in a variety of applications in industries requiring accuracy, precision and reliability. However, the most common conventional methods of measuring the hardness of hard coating films are pencil hardness methods because only inexpensive equipment is used, instead of expensive indenter equipment, and it is difficult to quantify the hardness with the pencil hardness method.

In addition, in order for the indenter to be used for measuring the hardness of the hard coating film, the substrate should be completely adhered to a flat stage such as a glass substrate in a measuring method in order to completely prevent lifting, and there was an issue in that the load should be selected according to the thickness of the substrate and the modulus of the substrate. However, the present disclosure is capable of obtaining effects of easily solving the problem of adhesion of the substrate using a film jig (meaning a unit for mounting the film) and standardizing the parameter of the hard coating film using an indenter.

When the lower layer has a thickness of 1 to 200 µm, preferably 3 to 150 µm, and more preferably 4 to 100 µm, it can be bent more easily due to the small thickness thereof, and can absorb impacts applied to the upper layer, thus obtaining effects of preventing cracking and maintaining the flexibility of the film.

When the thickness of the upper layer is 30 µm or less, preferably 0.5 to 25 µm, and more preferably 1 to 20 µm, a flexible film capable of maintaining flexibility while preventing scratches due to impacts can be obtained. When the upper layer is too thick, scratch resistance upon impact is improved, but a flexible film cannot be obtained due to the low flexibility thereof.

The substrate is preferably a transparent substrate, and any substrate may be used without particular limitation as long as it is transparent. The substrate may be a film such as PI, EN, TAC, COP, COC or acryl. Particularly, transparent polyimide is preferably used as a substrate because it provides excellent thermal properties, high modulus and high hardness of the film itself.

The transparent substrate has a thickness of 10 to 250 µm, preferably 15 to 150 µm.

The upper layer and the lower layer having the Vickers hardness described above may be formed by coating a resin composition generally used for hard coating.

In the present disclosure, an example of a resin composition that can be used for the upper and lower layers as a resin composition for forming a hard coating will be described in detail below.

<Resin Composition A of Upper Layer>

The resin of the high-hardness layer used in the present disclosure may be prepared through hydrolysis and condensation reaction between alkoxysilanes containing organics in the presence of hydroxyl groups.

Specifically, the high-hardness layer may include a siloxane resin obtained by polymerizing a compound including at least one alkoxysilane selected from an alkoxysilane represented by the following Formula 1 and an alkoxysilane represented by the following Formula 2.

$$R^1{}_n(OR^2)_{4-n} \qquad \text{<Formula 1>}$$

wherein $R^1$ is a C1-C3 linear, branched or cyclic alkyl group substituted with epoxy or acryl, $R^2$ is a C1-C8 linear, branched or cyclic alkyl group, and n is an integer of 1 to 3.

$$Si(OR^3)_4 \qquad \text{<Formula 2>}$$

wherein $R^3$ represents a C1 to C4 linear or branched alkyl group.

When preparing the siloxane resin including the alkoxysilane represented by Formula 1 and the alkoxysilane represented by Formula 2, the alkoxysilane represented by Formula 1 and the alkoxysilane represented by Formula 2 are preferably reacted at a molar ratio of 1:0.05 to 1:1, preferably 1:0.05 to 1:0.25, in view of ensuring high surface hardness and improving flexibility.

The hydrolysis and condensation reaction may be carried out at room temperature, but may be carried out while performing stirring at 100 rpm and at 50 to 120° C. for to 120 hours using a mechanical stirrer in order to facilitate the reaction, but the present disclosure is not limited thereto. The catalyst used to conduct the reaction for the present disclosure is sodium hydroxide. However, the catalyst used to conduct hydrolysis and condensation reaction may be an acid catalyst such as hydrochloric acid, acetic acid, hydrogen fluoride, nitric acid, sulfuric acid or iodic acid, a base catalyst such as ammonia, potassium hydroxide, sodium hydroxide, barium hydroxide or imidazole, and an ion exchange resin such as Amberite. Also, the catalyst may be selected from the group consisting of combinations thereof. The amount of the catalyst may be about 0.0001 parts to about 10 parts by weight, but is not limited thereto. When the hydrolysis and condensation reaction are conducted, water or alcohol is produced as a byproduct. When removing this water or alcohol, the reverse reaction can be suppressed and the forward reaction can be performed more quickly, so that control of the reaction rate is possible through this principle. After completion of the reaction, the byproduct can be removed by heating under reduced pressure.

In one embodiment of the present disclosure, an initiator may be further introduced to polymerize the siloxane resin, and is, for example, a photopolymerization initiator such as an onium salt or an organometallic salt and a thermal polymerization initiator such as amine and imidazole, but is not limited thereto. In this case, the amount of the initiator that is added is preferably about 0.01 to 10 parts by weight based on about 100 parts by weight of the siloxane resin.

In one embodiment of the present disclosure, an organic solvent may be further introduced in order to control the viscosity of the siloxane resin and to thereby facilitate processability and to adjust the thickness of the coating film, but is not limited thereto. The amount of organic solvent that is added is not particularly limited. Examples of useful organic solvents may include, but are not limited to, at least one selected from the group consisting of: ketones such as acetone, methyl ethyl ketone, methyl butyl ketone and cyclohexanone; cellosolves such as methyl cellosolve and butyl cellosolve; ethers such as ethyl ether and dioxane; alcohols such as isobutyl alcohol, isopropyl alcohol, butanol and methanol; halogenated hydrocarbons such as dichloromethane, chloroform and trichloroethylene; and hydrocarbons such as normal hexane, benzene and toluene.

In one embodiment of the present disclosure, the siloxane resin may include an antioxidant to inhibit the oxidation reaction caused by the polymerization reaction, but is not limited thereto.

In one embodiment of the present disclosure, the resin composition may further include a leveling agent or a coating aid, but is not limited thereto.

In one embodiment of the present disclosure, the polymerization may include light irradiation or heating, but is not limited thereto.

In one embodiment of the present disclosure, a cured coating product having high hardness can be obtained using the siloxane resin composition by forming using a method such as coating, casting or molding, followed by photopolymerization or thermal polymerization. In the case of photopolymerization, a uniform surface may be obtained by heat treatment before light irradiation, which may be performed at a temperature of about 40° C. or more and about 300° C. or less, but is not limited thereto. In addition, the light irradiation may be performed under a condition of 50 mJ/cm$^2$ or more and 20,000 mJ/cm$^2$ or less, but is not limited thereto.

<Resin Composition B of Lower Layer>

The resin of the highly bendable layer used in the present disclosure includes a siloxane resin obtained by condensation of a diol to an alkoxysilane containing an epoxy or an acryl, thereby improving hardness and abrasion resistance, flexibility and anti-curling property. Hardness and flexibility can be controlled by adjusting the amount of reagent that is added. As a result, a resin composition optimal for use can be obtained. Accordingly, the coating resin composition of the present disclosure has high surface hardness and scratch resistance due to the use of silane, and a film or sheet including the cured coating product having high hardness according to the present disclosure is prepared through photocuring reaction of the siloxane prepared by the condensation reaction between the diol and the alkoxysilane containing an epoxy or acryl, and H$_2$O may be added in order to improve reactivity and hardness.

The hydrolysis and condensation reaction may be carried out at room temperature, but may be carried out while performing stirring at 100 rpm and at 50 to 120° C. for to 120 hours using a mechanical stirrer in order to facilitate the reaction, but the present disclosure is not limited thereto. The catalyst used to conduct the reaction in the present disclosure is sodium hydroxide. However, the catalyst used to conduct the hydrolysis and condensation reaction may be an acid catalyst such as hydrochloric acid, acetic acid, hydrogen fluoride, nitric acid, sulfuric acid or iodic acid, a base catalyst such as ammonia, potassium hydroxide, sodium hydroxide, barium hydroxide or imidazole, and an ion exchange resin such as Amberite. Also, the catalyst may be selected from the group consisting of combinations thereof. The amount of the catalyst may be about 0.0001 parts to about 10 parts by weight, but is not limited thereto.

When the hydrolysis and condensation reaction are conducted, water or alcohol is produced as a byproduct. When removing this water or alcohol, the reverse reaction can be suppressed and the forward reaction can be performed more quickly, so that control of the reaction rate is possible through this principle. After completion of the reaction, the byproduct can be removed by heating under reduced pressure. In one embodiment of the present disclosure, the alkoxysilane for preparing the resin may include at least one selected from the alkoxysilane represented by Formula 1 and the alkoxysilane represented by Formula 2. The alkoxysilane for preparing the resin may further include at least one diol represented by the following Formula 3, but the present disclosure is not limited thereto.

$$R^1{}_n Si(OR^2)_{4-n} \qquad \text{<Formula 1>}$$

wherein $R^1$ is a C1-C3 linear, branched or cyclic alkyl group substituted with epoxy or acryl, $R^2$ is a C1-C8 linear, branched or cyclic alkyl group, and n is an integer of 1 to 3

$$Si(OR^3)_4 \qquad \text{<Formula 2>}$$

wherein $R^3$ represents a C1 to C4 linear or branched alkyl group $$HO(CH_2)_n OH \qquad \text{<Formula 3>}$$

wherein n is an integer of 1 to 10.

When preparing a siloxane resin including the alkoxysilane represented by Formula 1 and the alkoxysilane represented by Formula 2, the alkoxysilane represented by Formula 1 and the alkoxysilane represented by Formula 2 are preferably reacted at a molar ratio of 1:0.05 to 1:1, preferably 1:0.05 to 1:0.25, in view of ensuring high surface hardness and improving flexibility.

In addition, when preparing a siloxane resin including the alkoxysilane represented by Formula 1, the alkoxysilane represented by Formula 2 and the diol represented by Formula 3, the diol represented by Formula is present in a molar ratio (%) of 10 to 150 moles, preferably 10 to 100 moles, and more preferably 50 to 80 moles, with respect to a total of 100 moles of alkoxysilane. When the molar ratio of the diol exceeds the predetermined range, the polymerization rate may be slowed due to the problem of the diol residue, and conversely, when the molar ratio is below the predetermined range, the addition of the diol may be meaningless due to the small increase in flexibility.

In one embodiment of the present disclosure, an initiator may be further introduced to polymerize the siloxane resin, and is, for example, a photopolymerization initiator such as an onium salt or an organometallic salt and a thermal polymerization initiator such as amine and imidazole, but is not limited thereto. In this case, the amount of the initiator that is added is preferably about 0.01 to 10 parts by weight based on about 100 parts by weight of the siloxane resin, but is not limited thereto.

In one embodiment of the present disclosure, an organic solvent may be further introduced in order to control the viscosity of the siloxane resin and to thereby facilitate processability and to adjust the thickness of the coating film, but is not limited thereto. The amount of organic solvent that is added is not particularly limited. Examples of useful organic solvents may include, but are not limited to, at least one selected from the group consisting of: ketones such as acetone, methyl ethyl ketone, methyl butyl ketone and cyclohexanone; cellosolves such as methyl cellosolve and butyl cellosolve; ethers such as ethyl ether and dioxane; alcohols such as isobutyl alcohol, isopropyl alcohol, butanol and methanol; halogenated hydrocarbons such as dichloromethane, chloroform and trichloroethylene; and hydrocarbons such as normal hexane, benzene and toluene.

In one embodiment of the present disclosure, the siloxane resin may include an antioxidant to inhibit the oxidation reaction caused by the polymerization reaction, but is not limited thereto.

In one embodiment of the present disclosure, the resin composition may further include a leveling agent or a coating aid, but is not limited thereto.

In one embodiment of the present disclosure, the polymerization may include light irradiation or heating, but is not limited thereto.

In one embodiment of the present disclosure, a cured coating product having high hardness can be obtained using the siloxane resin composition by forming using a method such as coating, casting or molding, followed by photopolymerization or thermal polymerization. In the case of photopolymerization, a uniform surface may be obtained by heat treatment before light irradiation, which may be performed at a temperature of about 40° C. or more and about 300° C. or less, but is not limited thereto. In addition, the light irradiation may be performed under a condition of 50 mJ/cm² or more and 20,000 mJ/cm² or less, but is not limited thereto.

In addition, in another aspect, the present disclosure is directed to a polyimide film including the hard coating film.

MODE FOR DISCLOSURE

Hereinafter, the present disclosure will be described in more detail with reference to Examples. The examples are provided only for better understanding of the present disclosure, and should not be construed as limiting the scope of the present disclosure.

Among the compounds used in Examples and Comparative Examples of the present disclosure, KBM-403 is an alkoxysilane represented by Formula 1, which is $R^1{}_n Si(OR^2)_{4-n}$, wherein $R^1$ is a glycidoxypropyl group, $R^2$ is a methyl group and n is 1.

Example 1

A resin B of a lower layer was prepared as follows. KBM-403 (Shin-Etsu Chemical Co., Ltd.), TEOS (Sigma-Aldrich Corporation), ethylene glycol (Sigma-Aldrich Corporation) and distilled water were mixed at a molar ratio of 2.3:0.4:1.9:1.9, the resulting mixture was injected into a 1,000 mL flask, 0.1 equivalent of sodium hydroxide was added as a catalyst, and the mixture was stirred at 100 rpm using a mechanical stirrer at 90° C. for 8 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, and 60 parts by weight of EPOLIGHT 80MF (Kyoeisha Chemical Co., Ltd.) was added with respect to 100 parts by weight of the siloxane resin to finally obtain a resin composition for hard coating.

The composition was bar-coated to a thickness of 8 μm on a polyimide film (TH80, manufactured by Kolon Industries, Inc.) and then cured at a light dose of 2,000 mJ/cm² with an ultraviolet lamp having a wavelength of 315 nm to prepare a cured coating product.

A resin A of an upper layer was formed on the lower layer as follows. KBM-403 (Shin-Etsu Chemical Co., Ltd.), TEOS (Sigma-Aldrich Corporation) and H₂O were mixed at a molar ratio of 8:2:15, the resulting mixture was injected into a 1,000 mL flask, 0.1 equivalent of sodium hydroxide was added as a catalyst, and the mixture was stirred at 100 rpm with a mechanical stirrer at 60° C. for 10 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, to obtain a siloxane resin composition.

The composition was bar-coated to a thickness of 2 μm on the coating layer of the lower layer and then cured at a light dose of 2,000 mJ/cm$^2$ with an ultraviolet lamp having a wavelength of 315 nm to prepare a cured coating product.

Example 2

A resin B of a lower layer was prepared as follows. KBM-403 (Shin-Etsu Chemical Co., Ltd.), TEOS (Sigma-Aldrich Corporation), ethylene glycol (Sigma-Aldrich Corporation) and distilled water were mixed at a molar ratio of 2.3:0.4:1.9:1.9, the resulting mixture was injected into a 1,000 mL flask, 0.1 equivalent of sodium hydroxide was added as a catalyst, and the mixture was stirred at 100 rpm with a mechanical stirrer at 90° C. for 8 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, and 60 parts by weight of EPOLIGHT 80MF (Kyoeisha Chemical Co., Ltd.) was added with respect to 100 parts by weight of the siloxane resin to obtain a resin composition for hard coating.

The composition was bar-coated to a thickness of 15 μm on a polyimide film (TH80, manufactured by Kolon Industries, Inc.) and then cured at a light dose of 2,000 mJ/cm$^2$ with an ultraviolet lamp having a wavelength of 315 nm to prepare a cured coating product.

A resin A of an upper layer was formed on the lower layer as follows. KBM-403 (Shin-Etsu Chemical Co., Ltd.), TEOS (Sigma-Aldrich Corporation) and H$_2$O were mixed at a molar ratio of 8:2:15, the resulting mixture was injected into a 1,000 mL flask, 0.1 equivalent of sodium hydroxide was added as a catalyst, and the mixture was stirred at 100 rpm with a mechanical stirrer at 60° C. for 10 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, to obtain a siloxane resin composition.

The composition was bar-coated to a thickness of 2 μm on the coating layer of the lower layer and then cured at a light dose of 2,000 mJ/cm$^2$ with an ultraviolet lamp having a wavelength of 315 nm to prepare a cured coating product.

Example 3

A resin B of a lower layer was prepared as follows. KBM-403 (Shin-Etsu Chemical Co., Ltd.), TEOS (Sigma-Aldrich Corporation), ethylene glycol (Sigma-Aldrich Corporation) and distilled water were mixed at a molar ratio of 2.3:0.4:1.9:1.9, the resulting mixture was injected into a 1,000 mL flask, 0.1 equivalent of sodium hydroxide was added as a catalyst, and the mixture was stirred at 100 rpm with a mechanical stirrer at 90° C. for 8 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, 60 parts by weight of UFC012 (Kyoeisha Chemical Co., Ltd.) was added with respect to 100 parts by weight of the siloxane resin and 2 parts by weight of IRGACURE 184 (BASF Corporation) was added with respect to 100 parts by weight of the siloxane resin to obtain a resin composition for hard coating.

The composition was bar-coated to a thickness of 15 μm on a polyimide film (TH80, manufactured by Kolon Industries, Inc.) and then cured at a light dose of 2,000 mJ/cm$^2$ with an ultraviolet lamp having a wavelength of 315 nm to prepare a cured coating product.

A resin A of an upper layer was formed on the lower layer as follows. KBM-403 (Shin-Etsu Chemical Co., Ltd.), TEOS (Sigma-Aldrich Corporation) and H$_2$O were mixed at a molar ratio of 8:2:15, the resulting mixture was injected into a 1,000 mL flask, 0.1 equivalent of sodium hydroxide was added as a catalyst, and the mixture was stirred at 100 rpm with a mechanical stirrer at 60° C. for 10 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, to obtain a siloxane resin composition.

The composition was bar-coated to a thickness of 2 μm on the coating layer of the lower layer and then cured at a light dose of 2,000 mJ/cm$^2$ with an ultraviolet lamp having a wavelength of 315 nm to prepare a cured coating product.

Example 4

A resin B of a lower layer was prepared as follows. KBM-403 (Shin-Etsu Chemical Co., Ltd.), TEOS (Sigma-Aldrich Corporation), ethylene glycol (Sigma-Aldrich Corporation) and distilled water were mixed at a molar ratio of 2.3:0.4:1.9:1.9, the resulting mixture was injected into a 1,000 mL flask, 0.1 equivalent of sodium hydroxide was added as a catalyst, and the mixture was stirred at 100 rpm with a mechanical stirrer at 90° C. for 8 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, and 60 parts by weight of EPOLIGHT 80MF (Kyoeisha Chemical Co., Ltd.) was added with respect to 100 parts by weight of the siloxane resin to obtain a resin composition for hard coating.

The composition was bar-coated to a thickness of 8 μm on a polyimide film (TH80, manufactured by Kolon Industries, Inc.) and then cured at a light dose of 2,000 mJ/cm$^2$ with an ultraviolet lamp having a wavelength of 315 nm to prepare a cured coating product.

A resin A of an upper layer was formed on the lower layer as follows. KBM-403 (Shin-Etsu Chemical Co., Ltd.), TEOS (Sigma-Aldrich Corporation) and H$_2$O were mixed at a molar ratio of 9:1:15, the resulting mixture was injected into a 1,000 mL flask, 0.1 equivalent of sodium hydroxide was added as a catalyst, and the mixture was stirred at 100 rpm with a mechanical stirrer at 60° C. for 10 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, to obtain a siloxane resin composition.

The composition was bar-coated to a thickness of 2 μm on the coating layer of the lower layer and then cured at a light dose of 2,000 mJ/cm$^2$ with an ultraviolet lamp having a wavelength of 315 nm to prepare a cured coating product.

Example 5

A resin B of a lower layer was prepared as follows. KBM-403 (Shin-Etsu Chemical Co., Ltd.), TEOS (Sigma-Aldrich Corporation), ethylene glycol (Sigma-Aldrich Corporation) and distilled water were mixed at a molar ratio of 2.3:0.4:1.9:1.9, the resulting mixture was injected into a 1,000 mL flask, 0.1 equivalent of sodium hydroxide was added as a catalyst, and the mixture was stirred at 100 rpm with a mechanical stirrer at 90° C. for 8 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, 60 parts by weight of UFC012 (Kyoeisha Chemical Co., Ltd.) was added with respect to 100 parts by weight of the siloxane resin, and 2 parts by weight of IRGACURE 184 (BASF Corporation) was added with respect to 100 parts by weight of the siloxane resin to obtain a resin composition for hard coating.

The composition was bar-coated to a thickness of 15 μm on a polyimide film (TH80, manufactured by Kolon Industries, Inc.) and then cured at a light dose of 2,000 mJ/cm$^2$ with an ultraviolet lamp having a wavelength of 315 nm to prepare a cured coating product.

A resin A of an upper layer was formed on the lower layer as follows. KBM-403 (Shin-Etsu Chemical Co., Ltd.), TEOS (Sigma-Aldrich Corporation) and H$_2$O were mixed at a molar ratio of 9:1:15, the resulting mixture was injected into a 1,000 mL flask, 0.1 equivalent of sodium hydroxide was added as a catalyst, and the mixture was stirred at 100 rpm with a mechanical stirrer at 60° C. for 10 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, to obtain a siloxane resin composition.

The composition was bar-coated to a thickness of 2 μm on the coating layer of the lower layer and then cured at a light dose of 2,000 mJ/cm$^2$ with an ultraviolet lamp having a wavelength of 315 nm to prepare a cured coating product.

Example 6

A resin B of a lower layer was prepared as follows. KBM-403 (Shin-Etsu Chemical Co., Ltd.), TEOS (Sigma-Aldrich Corporation), ethylene glycol (Sigma-Aldrich Corporation) and distilled water were mixed at a molar ratio of 2.3:0.4:1.9:1.9, the resulting mixture was injected into a 1,000 mL flask, 0.1 equivalent of sodium hydroxide was added as a catalyst, and the mixture was stirred at 100 rpm with a mechanical stirrer at 90° C. for 8 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, and 60 parts by weight of EPOLIGHT 80MF (Kyoeisha Chemical Co., Ltd.) was added with respect to 100 parts by weight of the siloxane resin to obtain a resin composition for hard coating.

The composition was bar-coated to a thickness of 8 μm on a polyimide film (TH80, manufactured by Kolon Industries, Inc.) and then cured at a light dose of 2,000 mJ/cm$^2$ with an ultraviolet lamp having a wavelength of 315 nm to prepare a cured coating product.

A resin A of an upper layer was formed on the lower layer as follows. KBM-403 (Shin-Etsu Chemical Co., Ltd.), TEOS (Sigma-Aldrich Corporation) and H$_2$O were mixed at a molar ratio of 9.5:0.5:15, the resulting mixture was injected into a 1,000 mL flask, 0.1 equivalent of sodium hydroxide was added as a catalyst, and the mixture was stirred at 100 rpm with a mechanical stirrer at 60° C. for 10 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, to obtain a siloxane resin composition.

The composition was bar-coated to a thickness of 2 μm on the coating layer of the lower layer using a bar and then cured at a light dose of 2,000 mJ/cm$^2$ with an ultraviolet lamp having a wavelength of 315 nm to prepare a cured coating product.

Example 7

A cured coating product was prepared in the same manner as in Example 4 except that a polyimide film (TH50, manufactured by Kolon Industries, Inc.) was used as a substrate.

Example 8

A cured coating product was prepared in the same manner as in Example 1 except that a polyimide film (TH30, manufactured by Kolon Industries, Inc.) was used as a substrate and the lower layer was formed to a thickness of 50 μm.

Example 9

A cured coating product was prepared in the same manner as in Example 1 except that a polyimide film (TH30, manufactured by Kolon Industries, Inc.) was used as a substrate and the lower layer was formed to a thickness of 150 μm.

Example 10

A cured coating product was prepared in the same manner as in Example 1 except that a polyimide film (TH30, manufactured by Kolon Industries, Inc.) was used as a substrate and the lower layer was formed to a thickness of 15 μm.

Comparative Example 1

A resin B was prepared as follows. KBM-403 (Shin-Etsu Chemical Co., Ltd.), TEOS (Sigma-Aldrich Corporation), ethylene glycol (Sigma-Aldrich Corporation) and distilled water were mixed at a molar ratio of 2.3:0.4:1.9:1.9, the resulting mixture was injected into a 1,000 mL flask, 0.1 equivalent of sodium hydroxide was added as a catalyst, and the mixture was stirred at 100 rpm with a mechanical stirrer at 90° C. for 8 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, 60 parts by weight of UFC012 (Kyoeisha Chemical Co., Ltd.) was added with respect to 100 parts by weight of the siloxane resin, and 2 parts by weight of IRGACURE 184 (BASF Corporation) was added with respect to 100 parts by weight of the siloxane resin to obtain a resin composition for hard coating.

The composition was bar-coated to a thickness of 10 μm on a polyimide film (TH80, manufactured by Kolon Industries, Inc.) and then cured at a light dose of 2,000 mJ/cm$^2$ with an ultraviolet lamp having a wavelength of 315 nm to prepare a cured coating product.

Comparative Example 2

A resin B was prepared as follows. KBM-403 (Shin-Etsu Chemical Co., Ltd.), TEOS (Sigma-Aldrich Corporation), ethylene glycol (Sigma-Aldrich Corporation) and distilled water were mixed at a molar ratio of 2.3:0.4:1.9:1.9, the resulting mixture was injected into a 1,000 mL flask, 0.1 equivalent of sodium hydroxide was added as a catalyst, and the mixture was stirred at 100 rpm with a mechanical stirrer at 90° C. for 8 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, 60 parts by weight of UFC012 (Kyoeisha Chemical Co., Ltd.) was added with respect to 100 parts by weight of the siloxane resin, and 2 parts by weight of IRGACURE 184 (BASF Corporation) was added with respect to 100 parts by weight of the siloxane resin to obtain a resin composition for hard coating.

The composition was bar-coated to a thickness of 10 μm on a polyimide film (TH80, manufactured by Kolon Industries, Inc.) and then cured at a light dose of 2,000 mJ/cm$^2$ with an ultraviolet lamp having a wavelength of 315 nm to prepare a cured coating product.

Comparative Example 3

A resin A was prepared as follows. KBM-403 (Shin-Etsu Chemical Co., Ltd.), TEOS (Sigma-Aldrich Corporation) and H$_2$O were mixed at a molar ratio of 8:2:15, the resulting mixture was injected into a 1,000 mL flask, 0.1 equivalent of sodium hydroxide was added as a catalyst, and the mixture was stirred at 100 rpm with a mechanical stirrer at 60° C. for 10 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, to obtain a siloxane resin composition.

The composition was bar-coated to a thickness of 10 μm on a polyimide film (TH80, manufactured by Kolon Industries, Inc.) and was then cured at a light dose of 2,000 mJ/cm$^2$ with an ultraviolet lamp having a wavelength of 315 nm to prepare a cured coating product.

Comparative Example 4

A resin A was prepared as follows. KBM-403 (Shin-Etsu Chemical Co., Ltd.), TEOS (Sigma-Aldrich Corporation) and H$_2$O were mixed at a molar ratio of 9:1:15, the resulting mixture was injected into a 1,000 mL flask, 0.1 equivalent of sodium hydroxide was added as a catalyst, and the mixture was stirred at 100 rpm with a mechanical stirrer at 60° C. for 10 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, to obtain a siloxane resin composition.

The composition was bar-coated to a thickness of 10 μm on a polyimide film (TH80, manufactured by Kolon Industries, Inc.) and then cured at a light dose of 2,000 mJ/cm$^2$ with an ultraviolet lamp having a wavelength of 315 nm to prepare a cured coating product.

Comparative Example 5

A resin A was prepared as follows. KBM-403 (Shin-Etsu Chemical Co., Ltd.), TEOS (Sigma-Aldrich Corporation) and H$_2$O were mixed at a molar ratio of 9.5:0.5:15, the resulting mixture was injected into a 1,000 mL flask, 0.1 equivalent of sodium hydroxide was added as a catalyst, and the mixture was stirred at 100 rpm with a mechanical stirrer at 60° C. for 10 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, to obtain a siloxane resin composition.

The composition was bar-coated to a thickness of 10 μm on a polyimide film (TH80, manufactured by Kolon Industries, Inc.) and then cured at a light dose of 2,000 mJ/cm$^2$ with an ultraviolet lamp having a wavelength of 315 nm to prepare a cured coating product.

Comparative Example 6

A resin A was prepared as follows. KBM-403 (Shin-Etsu Chemical Co., Ltd.), TEOS (Sigma-Aldrich Corporation), ethylene glycol (Sigma-Aldrich Corporation) and distilled water were mixed at a molar ratio of 2.3:0.4:1.9:1.9, the resulting mixture was injected into a 1,000 mL flask, 0.1 equivalent of sodium hydroxide was added as a catalyst, and the mixture was stirred at 100 rpm with a mechanical stirrer at 90° C. for 8 hours. Then, the resulting mixture was diluted with 2-butanone to realize a solid content of 50 wt %, and was then filtered through a 0.45 μm Teflon filter to obtain a siloxane resin. Next, 3 parts by weight of IRGACURE 250 (BASF Corporation), which is a photoinitiator, was added with respect to 100 parts by weight of the siloxane resin, to obtain a siloxane resin composition.

The composition was bar-coated to a thickness of 10 μm on a polyimide film (TH80, manufactured by Kolon Industries, Inc.) and then cured at a light dose of 2,000 mJ/cm$^2$ with an ultraviolet lamp having a wavelength of 315 nm to prepare a cured coating product.

Comparative Example 7

A resin A of a lower layer was prepared as follows. KBM-403 (Shin-Etsu Chemical Co., Ltd.), TEOS (Sigma-Aldrich Corporation), ethylene glycol (Sigma-Aldrich Corporation) and distilled water were mixed at a molar ratio of 2.3:0.4:1.9:1.9, the resulting mixture was injected into a 1,000 mL flask, 0.1 equivalent of sodium hydroxide was added as a catalyst, and the mixture was stirred at 100 rpm with a mechanical stirrer at 90° C. for 8 hours. Then, the resulting mixture was diluted with 2-butanone to realize a solid content of 50 wt %, and was then filtered through a 0.45 µm Teflon filter to obtain a siloxane resin. Next, 3 parts by weight of IRGACURE 250 (BASF Corporation), which is a photoinitiator, was added with respect to 100 parts by weight of the siloxane resin, to obtain a siloxane resin composition.

The composition was bar-coated to a thickness of 8 µm on a polyimide film (TH80, manufactured by Kolon Industries, Inc.) and then cured at a light dose of 2,000 mJ/cm² with an ultraviolet lamp having a wavelength of 315 nm to prepare a cured coating product.

A resin A of an upper layer was formed on the lower layer as follows. KBM-403 (Shin-Etsu Chemical Co., Ltd.), TEOS (Sigma-Aldrich Corporation) and $H_2O$ were mixed at a molar ratio of 9.5:0.5:15, the resulting mixture was injected into a 1,000 mL flask, 0.1 equivalent of sodium hydroxide was added as a catalyst, and the mixture was stirred at 100 rpm with a mechanical stirrer at 60° C. for 10 hours. Then, the resulting mixture was diluted with 2-butanone to realize a solid content of 50 wt %, and was then filtered through a 0.45 µm Teflon filter to obtain a siloxane resin. Next, 3 parts by weight of IRGACURE 250 (BASF Corporation), which is a photoinitiator, was added with respect to 100 parts by weight of the siloxane resin, to obtain a siloxane resin composition.

The composition was bar-coated to a thickness of 2 µm on the coating layer of the lower layer and then cured at a light dose of 2,000 mJ/cm² with an ultraviolet lamp having a wavelength of 315 nm to prepare a cured coating product.

Comparative Example 8

A resin A of a lower layer was prepared as follows. KBM-403 (Shin-Etsu Chemical Co., Ltd.), TEOS (Sigma-Aldrich Corporation) and $H_2O$ were mixed at a molar ratio of 9:1:15, the resulting mixture was injected into a 1,000 mL flask, 0.1 equivalent of sodium hydroxide was added as a catalyst, and the mixture was stirred at 100 rpm with a mechanical stirrer at 60° C. for 10 hours. Then, the resulting mixture was diluted with 2-butanone to realize a solid content of 50 wt %, and was then filtered through a 0.45 µm Teflon filter to obtain a siloxane resin. Next, 3 parts by weight of IRGACURE 250 (BASF Corporation), which is a photoinitiator, was added with respect to 100 parts by weight of the siloxane resin, to obtain a siloxane resin composition.

The composition was bar-coated to a thickness of 8 µm on a polyimide film (TH80, manufactured by Kolon Industries, Inc.) and then cured at a light dose of 2,000 mJ/cm² with an ultraviolet lamp having a wavelength of 315 nm to prepare a cured coating product. A resin A of an upper layer was formed on the lower layer as follows. KBM-403 (Shin-Etsu Chemical Co., Ltd.), TEOS (Sigma-Aldrich Corporation) and $H_2O$ were mixed at a molar ratio of 8:2:15, the resulting mixture was injected into a 1,000 mL flask, 0.1 equivalent of sodium hydroxide was added as a catalyst, and the mixture was stirred at 100 rpm with a mechanical stirrer at 60° C. for 10 hours. Then, the resulting mixture was diluted with 2-butanone to realize a solid content of 50 wt %, and was then filtered through a 0.45 µm Teflon filter to obtain a siloxane resin. Next, 3 parts by weight of IRGACURE 250 (BASF Corporation), which is a photoinitiator, was added with respect to 100 parts by weight of the siloxane resin, to obtain a siloxane resin composition.

The composition was bar-coated to a thickness of 2 µm on the coating layer of the lower layer and then cured at a light dose of 2,000 mJ/cm² with an ultraviolet lamp having a wavelength of 315 nm to prepare a cured coating product.

Comparative Example 9

A resin B of a lower layer was prepared as follows. KBM-403 (Shin-Etsu Chemical Co., Ltd.), TEOS (Sigma-Aldrich Corporation), ethylene glycol (Sigma-Aldrich Corporation) and distilled water were mixed at a molar ratio of 2.3:0.4:1.9:1.9, the resulting mixture was injected into a 1,000 mL flask, 0.1 equivalent of sodium hydroxide was added as a catalyst, and the mixture was stirred at 100 rpm with a mechanical stirrer at 90° C. for 8 hours. Then, the resulting mixture was diluted with 2-butanone to realize a solid content of 50 wt %, and was then filtered through a 0.45 µm Teflon filter to obtain a siloxane resin. Next, 3 parts by weight of IRGACURE 250 (BASF Corporation), which is a photoinitiator, was added with respect to 100 parts by weight of the siloxane resin, and 60 parts by weight of EPOLIGHT 80MF (Kyoeisha Chemical Co., Ltd.) was added with respect to 100 parts by weight of the siloxane resin to obtain a resin composition for hard coating.

The composition was bar-coated to a thickness of 8 µm on a polyimide film (TH80, manufactured by Kolon Industries, Inc.) and then cured at a light dose of 2,000 mJ/cm² with an ultraviolet lamp having a wavelength of 315 nm to prepare a cured coating product.

A resin A of an upper layer was formed on the lower layer as follows. KBM-403 (Shin-Etsu Chemical Co., Ltd.), TEOS (Sigma-Aldrich Corporation), ethylene glycol (Sigma-Aldrich Corporation) and distilled water were mixed at a molar ratio of 2.3:0.4:1.9:1.9, the resulting mixture was injected into a 1,000 mL flask, 0.1 equivalent of sodium hydroxide was added as a catalyst, and the mixture was stirred at 100 rpm with a mechanical stirrer at 90° C. for 8 hours. Then, the resulting mixture was diluted with 2-butanone to realize a solid content of 50 wt %, and was then filtered through a 0.45 µm Teflon filter to obtain a siloxane resin. Next, 3 parts by weight of IRGACURE 250 (BASF Corporation), which is a photoinitiator, was added with respect to 100 parts by weight of the siloxane resin, to obtain a siloxane resin composition.

The composition was bar-coated to a thickness of 2 µm on the coating layer of the lower layer and then cured at a light dose of 2,000 mJ/cm² with an ultraviolet lamp having a wavelength of 315 nm to prepare a cured coating product.

Comparative Example 10

A resin B of a lower layer was prepared as follows. KBM-403 (Shin-Etsu Chemical Co., Ltd.), TEOS (Sigma-Aldrich Corporation), ethylene glycol (Sigma-Aldrich Corporation) and distilled water were mixed at a molar ratio of 2.3:0.4:1.9:1.9, the resulting mixture was injected into a 1,000 mL flask, 0.1 equivalent of sodium hydroxide was added as a catalyst, and the mixture was stirred at 100 rpm with a mechanical stirrer at 90° C. for 8 hours. Then, the resulting mixture was diluted with 2-butanone to realize a solid content of 50 wt %, and was then filtered through a 0.45 µm Teflon filter to obtain a siloxane resin. Next, 3 parts by weight of IRGACURE 250 (BASF Corporation), which is a photoinitiator, was added with respect to 100 parts by weight of the siloxane resin, and 60 parts by weight of EPOLIGHT 80MF (Kyoeisha Chemical Co., Ltd.) was added with respect to 100 parts by weight of the siloxane resin to obtain a resin composition for hard coating.

The composition was bar-coated to a thickness of 15 µm on a polyimide film (TH80, manufactured by Kolon Industries, Inc.) and then cured at a light dose of 2,000 mJ/cm² with an ultraviolet lamp having a wavelength of 315 nm to prepare a cured coating product.

A resin A of an upper layer was formed on the lower layer as follows. KBM-403 (Shin-Etsu Chemical Co., Ltd.), TEOS (Sigma-Aldrich Corporation), ethylene glycol (Sigma-Aldrich Corporation) and distilled water were mixed at a molar ratio of 2.3:0.4:1.9:1.9, the resulting mixture was injected into a 1,000 mL flask, 0.1 equivalent of sodium hydroxide was added as a catalyst, and the mixture was stirred at 100 rpm with a mechanical stirrer at 90° C. for 8 hours. Then, the resulting mixture was diluted with 2-butanone to realize a solid content of 50 wt %, and was then filtered through a 0.45 µm Teflon filter to obtain a siloxane resin. Next, 3 parts by weight of IRGACURE 250 (BASF Corporation), which is a photoinitiator, was added with respect to 100 parts by weight of the siloxane resin, to obtain a siloxane resin composition.

The composition was bar-coated to a thickness of 2 µm on the coating layer of the lower layer and then cured at a light dose of 2,000 mJ/cm² with an ultraviolet lamp having a wavelength of 315 nm to prepare a cured coating product.

Comparative Example 11

A resin B of a lower layer was prepared as follows. KBM-403 (Shin-Etsu Chemical Co., Ltd.), TEOS (Sigma-Aldrich Corporation), ethylene glycol (Sigma-Aldrich Corporation) and distilled water were mixed at a molar ratio of 2.3:0.4:1.9:1.9, the resulting mixture was injected into a 1,000 mL flask, 0.1 equivalent of sodium hydroxide was added as a catalyst, and the mixture was stirred at 100 rpm with a mechanical stirrer at 90° C. for 8 hours. Then, the resulting mixture was diluted with 2-butanone to realize a solid content of 50 wt %, and was then filtered through a 0.45 µm Teflon filter to obtain a siloxane resin. Next, 3 parts by weight of IRGACURE 250 (BASF Corporation), which is a photoinitiator, was added with respect to 100 parts by weight of the siloxane resin, 60 parts by weight of UFC012 (Kyoeisha Chemical Co., Ltd.) was added with respect to 100 parts by weight of the siloxane resin, and 2 parts by weight of IRGACURE 184 (BASF Corporation) was added with respect to 100 parts by weight of the siloxane resin to obtain a resin composition for hard coating.

The composition was bar-coated to a thickness of 15 µm on a polyimide film (TH80, manufactured by Kolon Industries, Inc.) and then cured at a light dose of 2,000 mJ/cm² with an ultraviolet lamp having a wavelength of 315 nm to prepare a cured coating product.

A resin A of an upper layer was formed on the lower layer as follows. KBM-403 (Shin-Etsu Chemical Co., Ltd.), TEOS (Sigma-Aldrich Corporation), ethylene glycol (Sigma-Aldrich Corporation) and distilled water were mixed at a molar ratio of 2.3:0.4:1.9:1.9, the resulting mixture was injected into a 1,000 mL flask, 0.1 equivalent of sodium hydroxide was added as a catalyst, and the mixture was stirred at 100 rpm with a mechanical stirrer at 90° C. for 8 hours. Then, the resulting mixture was diluted with 2-butanone to realize a solid content of 50 wt %, and was then filtered through a 0.45 µm Teflon filter to obtain a siloxane resin. Next, 3 parts by weight of IRGACURE 250 (BASF Corporation), which is a photoinitiator, was added with respect to 100 parts by weight of the siloxane resin, to obtain a siloxane resin composition.

The composition was bar-coated to a thickness of 2 µm on the coating layer of the lower layer and then cured at a light dose of 2,000 mJ/cm² with an ultraviolet lamp having a wavelength of 315 nm to prepare a cured coating product.

Measurement Example

The physical properties of the hard coating films produced in Examples and Comparative examples were evaluated in accordance with the following methods, and the results are shown in Tables 2 and 3 below.

(1) Vickers hardness (Hv) measured by indenter: measured using FISCHERSCOPE HM-2000 manufactured by Helmut Fischer GMBH using a load of 12 mN for a load time of 12 seconds.

(2) Tensile fracture point: measured by cutting the specimen to a size of 10 mm×100 mm using a UTM (INSTRON, UTM-5967) and applying tension thereto under the conditions of the distance between support points of 50 mm, a speed of 10 ram/min and a load cell of 30 kN.

(3) Scratch resistance: #0000 steel wool was reciprocated 10 times at a load of 1 kg, whether or not scratching was observed with the naked eye and scratch property was determined based on the following criteria.

OK: no scratching occurred

NG: scratching occurred (4) Inverse R: The sample was loaded such that the coating surface was directed upwards using bending tester equipment (JIRBT-620, Junil Tech Co., Ltd.) and the radius (R) at which cracking occurred was measured while narrowing the radius.

(5) Transmittance: measured in accordance with ASTM D1003 using HM-150 manufactured by MURAKAMI Co.

(6) Haze: measured in accordance with ASTM D1003 using HM-150 manufactured by MURAKAMI Co.

(7) Bendability (EIT/HIT) (EIT: indentation modulus, HIT: indentation hardness): measured using FISCHERSCOPE HM-2000 manufactured by Helmut Fischer GMBH using a load of 12 mN for a load time of 12 seconds.

Also, the following Table 1 shows the ingredients of the compositions for the upper layer and the lower layer.

TABLE 1

| A1 | Siloxane resin (100 parts by weight) | KBM-403 (Shin-Etsu Chemical Co., Ltd.):TEOS (Sigma-Aldrich Corporation):H₂O mixed at molar ratio of 8:2:15 |
| | Photoinitiator (3 parts by weight) | IRGACURE 250 (BASF Corporation) |

TABLE 1-continued

| | | |
|---|---|---|
| A2 | Siloxane resin (100 parts by weight) | KBM-403 (Shin-Etsu Chemical Co., Ltd.):TEOS (Sigma-Aldrich Corporation):H$_2$O mixed at molar ratio of 9:1:15 |
| | Photoinitiator (3 parts by weight) | IRGACURE 250 (BASF Corporation) |
| A3 | Siloxane resin (100 parts by weight) | KBM-403 (Shin-Etsu Chemical Co., Ltd.):TEOS (Sigma-Aldrich Corporation):H$_2$O mixed at molar ratio of 9.5:0.5:15 |
| | Photoinitiator (3 parts by weight) | IRGACURE 250 (BASF Corporation) |
| A4 | Siloxane resin (100 parts by weight) | KBM-403(Shin-Etsu Chemical Co., Ltd.):TEOS (Sigma-Aldrich Corporation):Ethylene Glycol (Sigma-Aldrich Corporation):H$_2$O mixed at molar ratio of 2.3:0.4:1.9:1.9 |
| | Photoinitiator (3 parts by weight) | IRGACURE 250 (BASF Corporation) used in amount of 3 parts by weight |
| B1 | Siloxane resin (100 parts by weight) | KBM-403 (Shin-Etsu Chemical Co., Ltd.):TEOS (Sigma-Aldrich Corporation):Ethylene Glycol (Sigma-Aldrich Corporation):H$_2$O mixed at molar ratio of 2.3:0.4:1.9:1.9 |
| | Photoinitiator (3 parts by weight) | IRGACURE 250 (BASF Corporation) |
| | Monomer (60 parts by weight) | EPOLIGHT 80MF (Kyoeisha Chemical Co., Ltd.) |
| B2 | Siloxane resin (100 parts by weight) | KBM-403 (Shin-Etsu Chemical Co., Ltd.):TEOS (Sigma-Aldrich Corporation):Ethylene Glycol (Sigma-Aldrich Corporation):H$_2$O mixed at molar ratio of 2.3:0.4:1.9:1.9 |
| | Photoinitiator (3 parts by weight) | IRGACURE 250 (BASF Corporation) |
| | Oligomer (60 parts by weight) | UFC012 (Kyoeisha Chemical Co., Ltd.) |
| | Photoinitiator (2 parts by weight) | IRGACURE 184 (BASF Corporation) |

TABLE 2

| | Type of composition, thickness | | Vickers hardness (Hv) | | |
|---|---|---|---|---|---|
| Type | Lower layer | Upper layer | Lower layer | Upper layer | Hard coating film |
| Ex. 1 | B1, 8 μm | A1, 2 μm | 22.9 | 79.1 | 27.4 |
| Ex. 2 | B1, 15 μm | A1, 2 μm | 18.5 | 79.1 | 21.8 |
| Ex. 3 | B2, 8 μm | A1, 2 μm | 21.6 | 79.1 | 25.1 |
| Ex. 4 | B1, 8 μm | A2, 2 μm | 22.9 | 67.8 | 26.6 |
| Ex. 5 | B2, 8 μm | A2, 2 μm | 21.6 | 67.8 | 22.6 |
| Ex. 6 | B1, 8 μm | A3, 2 μm | 22.9 | 56.2 | 24.3 |
| Ex. 7 | B1, 8 μm | A2, 2 μm | 22.9 | 46.5 | 26.1 |
| Ex. 8 | B1, 50 μm | A1, 2 μm | 12.0 | 79.1 | 20.6 |
| Ex. 9 | B1, 150 μm | A1, 2 μm | 10.2 | 79.1 | 20.0 |
| Ex. 10 | B1, 8 μm | A1, 15 μm | 22.9 | 90.3 | 29.3 |
| Comp. Ex. 1 | B1, 10 μm | | Absence | Absence | 24.3 |
| Comp. Ex. 2 | B2, 10 μm | | Absence | Absence | 24.2 |
| Comp. Ex. 3 | A1, 10 μm | | Absence | Absence | 84.5 |
| Comp. Ex. 4 | A2, 10 μm | | Absence | Absence | 75.0 |
| Comp. Ex. 5 | A3, 10 μm | | Absence | Absence | 65.2 |
| Comp. Ex. 6 | A4, 10 μm | | Absence | Absence | 50.3 |
| Comp. Ex. 7 | A4, 8 μm | A3, 2 μm | 43.2 | 56.2 | 57.2 |
| Comp. Ex. 8 | A3, 8 μm | A1, 2 μm | 61.6 | 79.1 | 76.4 |
| Comp. Ex. 9 | B1, 8 μm | A4, 2 μm | 22.9 | 46.5 | 24.2 |
| Comp. Ex. 10 | B1, 15 μm | A4, 2 μm | 18.5 | 46.5 | 20.4 |
| Comp. Ex. 11 | B2, 8 μm | A4, 2 μm | 21.6 | 46.5 | 24.5 |

TABLE 3

| | Hv | Bendability (EIT/HIT) | Tensile fracture point | Inverse R | Scratch resistance | Transmittance | Haze |
|---|---|---|---|---|---|---|---|
| Ex. 1 | 27.4 | 10.8 | 6.3% | R1.2 | OK | ≥90% | ≤1.0% |
| Ex. 2 | 21.8 | 11.4 | 7.0% | R1.4 | OK | ≥90% | ≤1.0% |
| Ex. 3 | 25.1 | 12.5 | 8.4% | R1.0 | OK | ≥90% | ≤1.0% |
| Ex. 4 | 26.6 | 10.2 | 6.7% | R1.0 | OK | ≥90% | ≤1.0% |
| Ex. 5 | 22.6 | 13.6 | 9.3% | R1.0 | OK | ≥90% | ≤1.0% |
| Ex. 6 | 24.3 | 12.7 | 8.7% | R1.0 | OK | ≥90% | ≤1.0% |
| Ex. 7 | 26.1 | 10.8 | 6.4% | R1.0 | OK | ≥90% | ≤1.0% |
| Ex. 8 | 20.6 | 12.4 | 7.2% | ≤R2.0 | OK | ≥90% | ≤1.0% |

TABLE 3-continued

| | Hv | Bendability (EIT/HIT) | Tensile fracture point | Inverse R | Scratch resistance | Transmittance | Haze |
|---|---|---|---|---|---|---|---|
| Ex. 9 | 20.0 | 12.3 | 6.9% | ≤R2.0 | OK | ≥90% | ≤1.0% |
| Ex. 10 | 29.3 | 10.3 | 6.0% | ≤R2.0 | OK | ≥90% | ≤1.0% |
| Comp. Ex. 1 | 24.3 | 20.6 | 31% | ≤R1.0 | NG | ≥90% | ≤1.0% |
| Comp. Ex. 2 | 24.2 | 21.3 | 34% | ≤R1.0 | NG | ≥90% | ≤1.0% |
| Comp. Ex. 3 | 84.5 | 4.0 | 3.0% | R3.0 | OK | ≥90% | ≤1.0% |
| Comp. Ex. 4 | 75.0 | 5.2 | 4.0% | R2.4 | OK | ≥90% | ≤1.0% |
| Comp. Ex. 5 | 65.2 | 5.8 | 4.5% | R2.2 | OK | ≥90% | ≤1.0% |
| Comp. Ex. 6 | 50.3 | 6.5 | 5.0% | R1.8 | NG | ≥90% | ≤1.0% |
| Comp. Ex. 7 | 57.2 | 6.7 | 4.8% | R2.0 | OK | ≥90% | ≤1.0% |
| Comp. Ex. 8 | 76.4 | 5.0 | 3.3% | R2.9 | OK | ≥90% | ≤1.0% |
| Comp. Ex. 9 | 24.2 | 14.7 | 10.8% | ≤R1.0 | NG | ≥90% | ≤1.0% |
| Comp. Ex. 10 | 20.4 | 15.2 | 11.6% | R1.2 | NG | ≥90% | ≤1.0% |
| Comp. Ex. 11 | 24.5 | 18.1 | 17.1% | ≤R1.0 | NG | ≥90% | ≤1.0% |

*Note:
In the above table, "≤" means not more than and "≥" means not less than.

As shown in Table 2 and Table 3, Examples 1 to 6 have excellent scratch resistance despite the low Hv of about 20 to 30, and an inverse R value of 2.0 or less and C/S of 6% or more, which means that it was possible to obtain a flexible hard-coating film with excellent bendability. When the C/S is not more than 6%, cracks may occur when flexibility, enabling folding and unfolding operations to be repeated in an outer direction of a coating direction, is required.

Meanwhile, it can be seen that Comparative Examples 1 and 2 had similar Hv values to Examples 1 to 6 and an inverse R of 2.0 or less, and exhibited good bendability, but scored "NG" with regard to scratch resistance. It can be seen that Comparative Examples 3 to 5 scored "OK" with regard to scratch resistance due to high Hv values, but had R of 2.0 or more and bendability of 6 or less.

In addition, in Comparative Example 7, when the hardness (Hv) of the lower layer is 40 or more, the inverse R is 2.0 or more, and bendability is poor. In Comparative Example 8, when the hardness of the hard coating is excessively high, scratch resistance is excellent, but flexibility is poor.

In addition, in Comparative Examples 9 to 10, when the hardness (Hv) of the upper layer is 55 or less, bendability is excellent, but scratch resistance is poor. A multilayer coating film has a lower Hv, but better scratch resistance and flexibility than a single layer coating film. As described above, in the present disclosure, a hard coating film having a multilayer structure has a low Hv, but has a reverse R of 2.0 or less, excellent bendability, better optical properties and superior scratch resistance.

INDUSTRIAL APPLICABILITY

The present disclosure is applicable to a transparent polymer film that can be extensively utilized as a core material in the fields of optical, transparent and flexible displays.

The invention claimed is:

1. A hard coating film having a structure in which a highly bendable layer and a high-hardness layer are stacked on a substrate in that order,
wherein the highly bendable layer has a Vickers hardness (Hv) of 40 or less,
the hardness layer has a Vickers hardness (Hv) of 55 or more, and
the hard coating film including the highly bendable layer and the hardness layer stacked on the substrate in that order has a Vickers hardness (Hv) of 20 to 65, and
wherein the highly bendable layer comprises a siloxane resin obtained by polymerizing a compound comprising: at least one alkoxysilane selected from an alkoxysilane represented by the following Formula 1 and an alkoxysilane represented by the following Formula 2; and a diol represented by the following Formula 3:

<Formula 1> wherein $R^1$ is a C1-C3 linear, branched or cyclic alkyl group substituted with epoxy or acryl, $R^2$ is a C1-C8 linear, branched or cyclic alkyl group, and n is an integer of 1 to 3,

<Formula 2> wherein $R^3$ represents a C1 to C4 linear or branched alkyl group,

<Formula 3> wherein n is an integer of 1 to 10.

2. The hard coating film according to claim 1, wherein the substrate is a transparent polyimide substrate.

3. The hard coating film according to claim 1, wherein the hard coating film has a reverse R of 2.0 or less.

4. The hard coating film according to claim 1, wherein the hard coating film has a tensile fracture point of 6% or more.

5. The hard coating film according to claim 1, wherein the hard coating film has a bendability (EIT (indentation modulus)/HIT (indentation hardness) of 8 or more.

6. The hard coating film according to claim 1, wherein the hard coating film has a transmittance of 90% or more and a haze of 1.0% or less.

7. The hard coating film according to claim 1, wherein the highly bendable layer has a thickness of 1 to 200 μm, and the hardness layer has a thickness of 30 μm or less.

8. A polyimide film comprising the hard coating film according to claim 1.

* * * * *